Nov. 24, 1964  R. FILLOL  3,158,089
DEVICE FOR PRESSING GRUYERE CHEESES
Filed Sept. 25, 1961
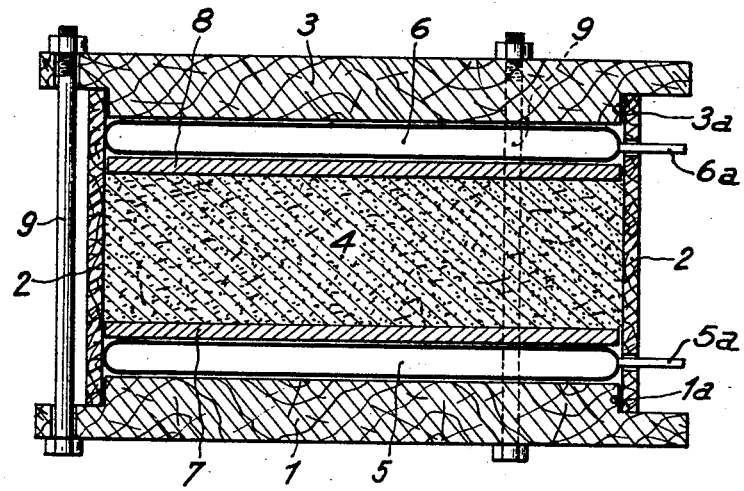
INVENTOR:
ROBERT FILLOL

United States Patent Office 3,158,089
Patented Nov. 24, 1964

3,158,089
DEVICE FOR PRESSING GRUYERE CHEESES
Robert Fillol, 87 Rue de Lourmal, Paris, France
Filed Sept. 25, 1961, Ser. No. 140,500
Claims priority, application France, Sept. 29, 1960, 839,845, Patent 1,275,438
4 Claims. (Cl. 100—244)

The manufacture of pressed cheeses and notably Gruyere cheeses takes place according to the following sequence of steps, except for a few modifications: the milk is curdled with rennet and stirred to form a heterogenous product consisting on the one hand of solid material—the finely divided curds—and on the other hand of a liquid, the serum.

Then the solid and liquid phases are separated according to various methods such as decantation, sieving through a cloth or gauze for allowing the liquid to drain, etc.

The final product is fed to a mould and then pressed into the desired shape.

In the case of Gruyere cheeses this mould consists of a wooden outer or end plate, sometimes called "foncet," of a hoop or like cylindrical member also made of wood but of a diameter variable by means of a rope system, and finally of another outer or end plate.

The curdled mass enclosed in a cloth is introduced into this mould; the hoop diameter is adjusted to allow the curdled mass to project slightly beyond this circle, and then, by using another plate and a press, the mass is pressed more or less to form a cylinder; this cylinder is turned upside down several times in order to exert the pressure alternately on one and the other face. During these operations the cloth is replaced and the pressure is increased gradually.

The pressing operation as now practised is a subjection in that it requires a staff of strong men working intermittently, as the cakes are turned irregularly, that is, at increasingly longer time intervals during a complete period of about 24 hours. Moreover, the work is difficult and tiresome. Finally, the presses occupy a considerable floor space and their presence makes it impossible to superpose a plurality of moulds containing Gruyere cheeses subjected to the pressing operation.

It is the object of this invention to avoid these inconveniences.

To this end, the present invention provides a method of pressing Gruyere cheeses which consists in exerting a gradually increasing pneumatic pressure simultaneously on the two opposite faces of the cheese placed in a mould.

It is the object of this invention to provide a device for carrying out the method broadly set forth hereinabove, this device being characterized in that in a mould consisting of a lower end plate on which the hoop or cylinder consistuting the lateral wall of the mould is placed, and of an upper end plate closing the mould, a pneumatic bladder or like device is interposed between each plate and the cheese to be pressed, that the bladder valves extend thorugh one wall of the above-defined mould so that the bladders may be inflated and deflated at will therethrough during the pressing operation, and that fastening means keep the mould elements tightly assembled during the bladder pressurization.

The mould component elements such as the plates and hoop may be made from any suitable and sufficiently strong material, such as steel, aluminium, plastics, etc.

It is advantageous to interpose between each pneumatic bladder and the cheese a plate having the same area as the cross-section of the mould in order to distribute uniformly on the cheese the pressure exerted by the pneumatic bladder.

In this case the bladders having a surface substantially equal to the area of the cross-section of the mould may be replaced by pneumatic bladders of smaller surface and different shape, for example by pneumatic elements like the inner tubes of tyres of automotive vehicles.

The mould end plates are formed preferably along the outer periphery of one of their faces with an annular shoulder whereby these plates may fit over the corresponding edge of the mould cylinder when they are applied with this face against the cylinder, in order to reduce the inner volume of the mould as a function of the volume of curdled milk to be treated.

The means for assembling the component elements of the mould with one another may consist for example of tie-rods interconnecting the registering edges of the two end plates and pressing them against the cylinder, but of course any other means adapted to assemble with a sufficient force the two end plates with the mould cylinder may be used.

A pump or any other suitable device may be used for inflating the pneumatic bladders or tubes. A compressed air line with an adjustable pressure reducing device is particularly suitable for the purpose; with this device the necessity of restoring the pressure as the cheese settles or packs up may be dispensed with.

Of course, the device according to this invention permits of compressing the cheese simultaneously on both faces with a pressure adjustable at will on each face through the medium of the two pneumatic bladders or the like. The degree of compression in a given time period may be modified by gradually inflating the bladders. The difficult and awkward step of turning the moulds upside down is eliminated as well as the opening of the moulds for replacing the cloth, and moreover this cloth may be dispensed with. In addition the moulds charged with cheese may be stacked, thus reducing appreciably the floor space required for this pressing operation. Finally, should the manufacturer deem that the mould turning step is necessary, for example in order to avoid the effects of gravity in the cheese mass, suitable means may be used without difficulty for effecting this reversal for example by turning a complete pile of moulds in one movement.

A specific form of embodiment of this invention will now be described with reference to the accompanying drawing of which the single figure illustrates diagrammatically in axial vertical section the device for pressing Gruyere cheese in a mould form.

The Gruyere cheese moulding device illustrated comprises a lower plate 1 formed on one face with a marginal shoulder 1a, a cylinder or hoop 2 carried by the lower plate 1, and an upper plate 3 formed like the lower plate 1 with a peripheral shoulder 3a on one face.

These end plates 1, 3 may engage the registering edge of the cylinder 2 either with their flat or smooth face or with their shouldered edge, as shown in the drawing. The shoulders 1a and 3a permit of fitting the plates 1 and 3 with a moderate play in the cylinder 2, thus reducing the inner volume of the mould. The plate position—which may be the same or differ for the two plates—is selected as a function of the volume of curdled milk to be used in the mould.

The cheese 4 in the form of drained curds is disposed inside the mould between two pneumatic bladders or like devices 5, 6 engaging the plates 1 and 3 respectively. Inflating valves 5a, 6a associated with these bladders respectively extend through suitable orifices formed in the cylinder 2, whereby the bladders may be inflated from outside at will.

Preferably, as illustrated in the drawing, a rigid inner plate 7 or 8, for example of steel, is interposed between each bladder 5 or 6 and the cheese mass 4; its purpose is to ensure a uniform distribution of the pressure exerted by the corresponding pneumatic bladder over the entire mass of cheese when the bladder is inflated.

Both end plates 1 and 3 are rigidly mounted on the cylinder 2 by means of tie-rods 9 interconnecting the marginal portions of these plates.

To press a cheese a suitable inflating device (not shown) is operated, this device having its outlet connected to the valves 5a and 6a leading to the bladders 5, 6 respectively. Thus, the two bladders may be inflated at will either simultaneously or alternately, and if desired the pressure exerted on each opposite face of the cheese mass may be adjusted at will. As the cheese settles or is rammed by the pressure applied thereto, the pressure is restored by further inflating the bladders. In the figure the bladders are shown in their maximum inflated condition corresponding to the final phase of the pressing operation; the maximum volume of these bladders is selected accordingly.

It is relatively easy to pile up a plurality of similar moulds of this general type on one another, so that a substantial reduction in floor space is obtained in comparison with prior art moulds requiring the use of a superposed press.

Many modifications may be brought to the device illustrated and described herein by way of example, notably in connection with the specific shape and dimensions of the end plates, pneumatic bladders or inner tubes, and also with the shape of the mould proper, without however departing from the spirit and scope of the invention as set forth in the appended claims.

What I claim is:

1. In a press adapted to press a Gruyere cheese which becomes progressively more rigid as the pressing operation continues, in combination: an upper transverse movable circular plate member adapted for engagement with an upper surface of the cheese, a lower transverse movable circular plate member adapted for engagement with a lower surface of the cheese directly below said upper surface, a common cylindrical wall means surrounding said cheese and said movable plate members, end closure means closing opposite ends of said wall means, said end closure means having edge portions which extend past said wall means, removable tie rods extending bebtween the closure means and passing through openings in said edge portions to clamp the wall means between said end closure means, said end closure means being removable at will to open at least one end of said wall means, said end closure means defining a separate space between said closure means and each of said movable plate members, a deformable hollow air-tight member in each space, and means for inflating said air-tight members.

2. A press for pressing material which progressively becomes more rigid during the course of the pressing operation, said press comprising: elongated rigid wall means defining a laterally enclosed space of uniform cross-sectional configuration throughout its length, said wall means being open at one end; a removable end closure member closing said open end of said wall means; a rigid plate member having a flat surface perpendicular to the longitudinal axis of said wall means, said plate member being freely slidable within said wall means longitudinally thereof intermediate said closure member and the other end of said wall means to define therebetween a completely enclosed space of constant cross-sectional area and variable volume for receiving said material; a deformable hollow air-tight member interposed between said plate member and said end closure member; means for inflating said air-tight member; and means for holding said closure member in closing position during operation of said inflating means.

3. A press for pressing material which progressively becomes more rigid during the course of the pressing operation, said press comprising: elongated rigid wall means defining a laterally enclosed space of uniform cross-sectional configuration throughout its length, said wall means being open at both ends; a pair of removable end closure members each closing one end of said wall means; upper and lower rigid plate members having flat confronting surfaces perpendicular to the longitudinal axis of said wall means, both of said plate members being freely slidably within said wall means longitudinally thereof intermediate said closure members to define therebetween a completely enclosed space of constant cross-sectional area and variable volume for receiving said material; a pair of air-tight bladder members each interposed between one of said plate members and one of said end closure members within said wall means and exteriorly of said completely enclosed space; means for inflating said bladder members; and means for holding said closure members in closing position during operation of said inflating means.

4. A press according to claim 3, wherein said means for holding said closure members comprises a plurality of tension members rigidly interconnecting said closure members.

References Cited in the file of this patent

UNITED STATES PATENTS

| | | |
|---|---|---|
| 27,845 | Taft | Apr. 10, 1860 |
| 92,201 | McCullough et al. | July 6, 1869 |
| 280,745 | Hyatt | July 3, 1883 |
| 1,177,240 | Gates | Mar. 28, 1916 |
| 1,312,615 | Cooper | Aug. 12, 1919 |
| 1,348,004 | Henry | July 27, 1920 |
| 1,634,047 | Smith | June 28, 1927 |
| 1,806,861 | Owen | May 26, 1931 |
| 1,872,693 | Drake | Aug. 23, 1932 |
| 2,022,679 | Leo | Dec. 3, 1935 |
| 2,362,089 | Peters | Nov. 7, 1944 |
| 2,363,779 | Duffy et al. | Nov. 28, 1944 |
| 2,519,661 | Johnson | Aug. 22, 1950 |
| 2,869,173 | Van Hartesveldt | Jan. 20, 1959 |

FOREIGN PATENTS

| | | |
|---|---|---|
| 720,230 | Great Britain | Dec. 15, 1954 |